Jan. 15, 1963  C. O. GLASGOW  3,073,159
METER
Filed Dec. 5, 1960  4 Sheets-Sheet 1

INVENTOR.
CLARENCE O. GLASGOW
BY Arthur L. Wade
ATTORNEY

INVENTOR.
CLARENCE O. GLASGOW
BY Arthur L Wade
ATTORNEY

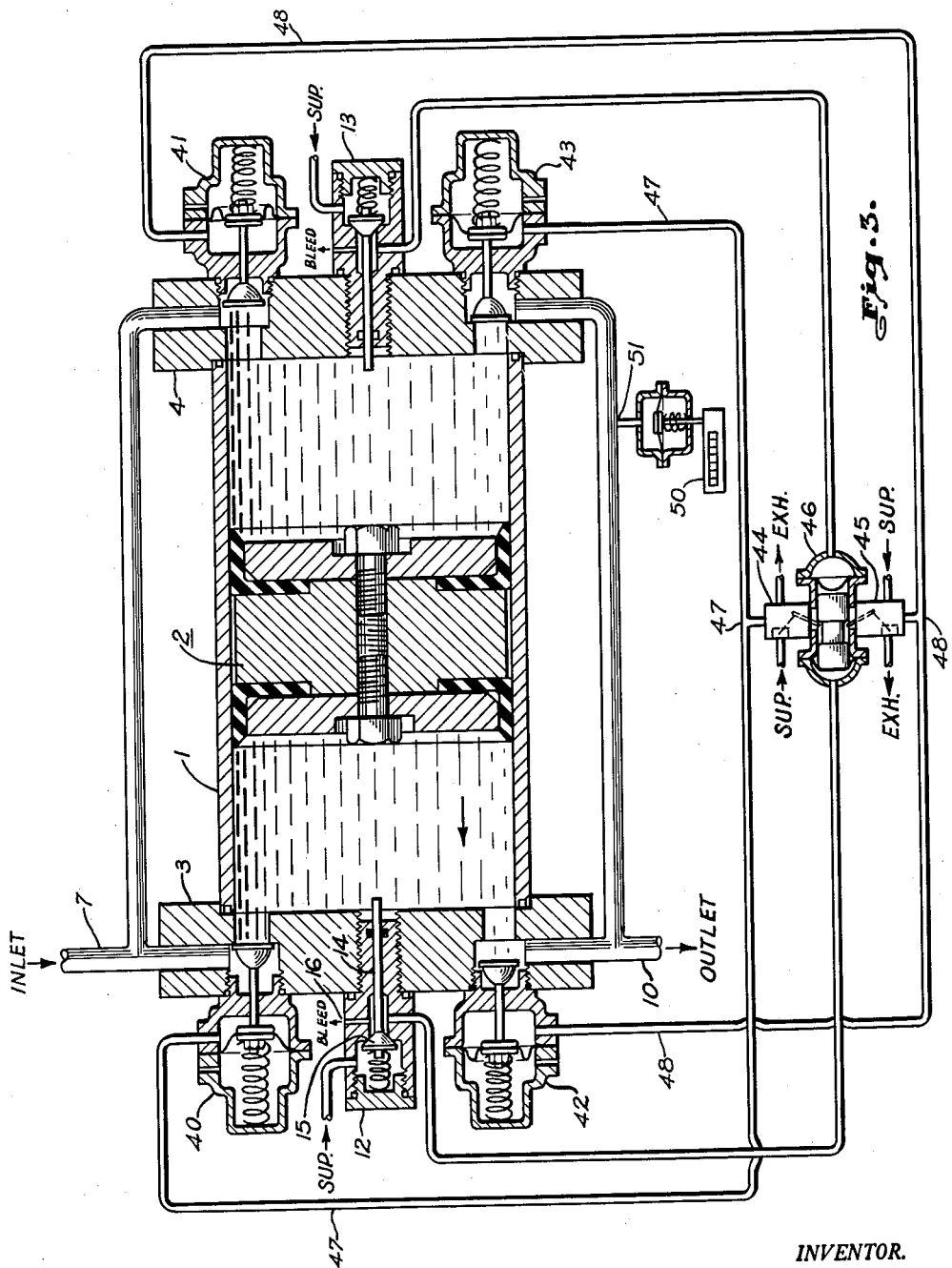

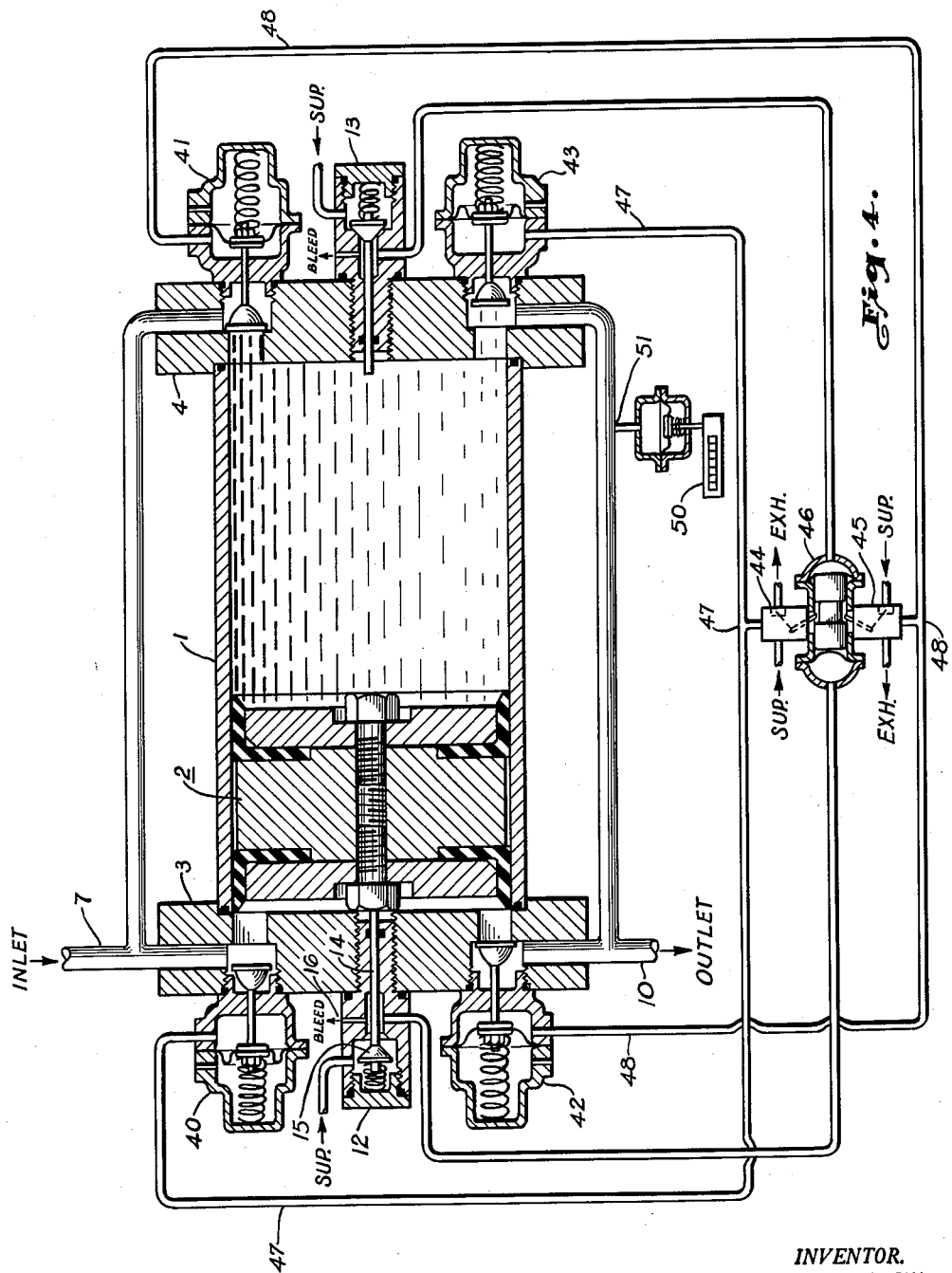

United States Patent Office 3,073,159
Patented Jan. 15, 1963

3,073,159
METER
Clarence O. Glasgow, Tulsa, Okla., assignor to National Tank Company, Tulsa, Okla., a corporation of Nevada
Filed Dec. 5, 1960, Ser. No. 73,911
4 Claims. (Cl. 73—249)

The present invention relates to a positive displacement meter. More specifically, the invention relates to a free-piston type positive displacement meter with input and output valves automatically operated to prevent fluid passing through the meter without being metered.

Positive displacement meters with a free-piston are operated by the free-piston actuating valving at either end of its stroke to reverse its stroke. The valving alternately provides the fluid supply to opposite sides of the piston and removes this fluid as metered. If the input and output valves on one side of the piston stick, or overlap in operation, fluid entering the meter on that side of the piston will pass out of the piston chamber as not metered. A control system to properly operate the valves in a consistent manner is required to avoid "slippage" and operate the free piston automatically and positively.

A principal object of the present invention is to automatically operate a free-piston positive displacement meter with power from the fluid pumped without slippage.

Another object is to develop a control fluid pressure at the completion of each stroke which is used to reverse the position of the input and output valves.

Another object is to interlock the input and output valves so they will be positively prevented from overlapping in operation.

The present invention contemplates a free-piston positive displacement meter with an inlet and outlet valve set on each side of the reciprocating piston. The fluid metered flows in through each inlet valve, alternately, and out each outlet valve, alternately, the piston reciprocating automatically under the power of the pressure of the metered fluid.

The invention further contemplates a shift valve positioned on each side of the piston, the valves alternately actuated by the piston at the end of each stroke. The outputs of the valves shift the sets of inlet and outlet valves to alternately apply fluid to be metered to each side of the piston and discharge fluid metered.

The invention further contemplates a system of positive, two-position, valves responsive to the shift valves and interlocks with which to preclude overlap in operation of the inlet and outlet valves of each set.

Other objects and advantages and features of this invention will become more apparent to one skilled in the art upon consideration of the written specification, appended claims and attached drawings wherein;

Figure 1:
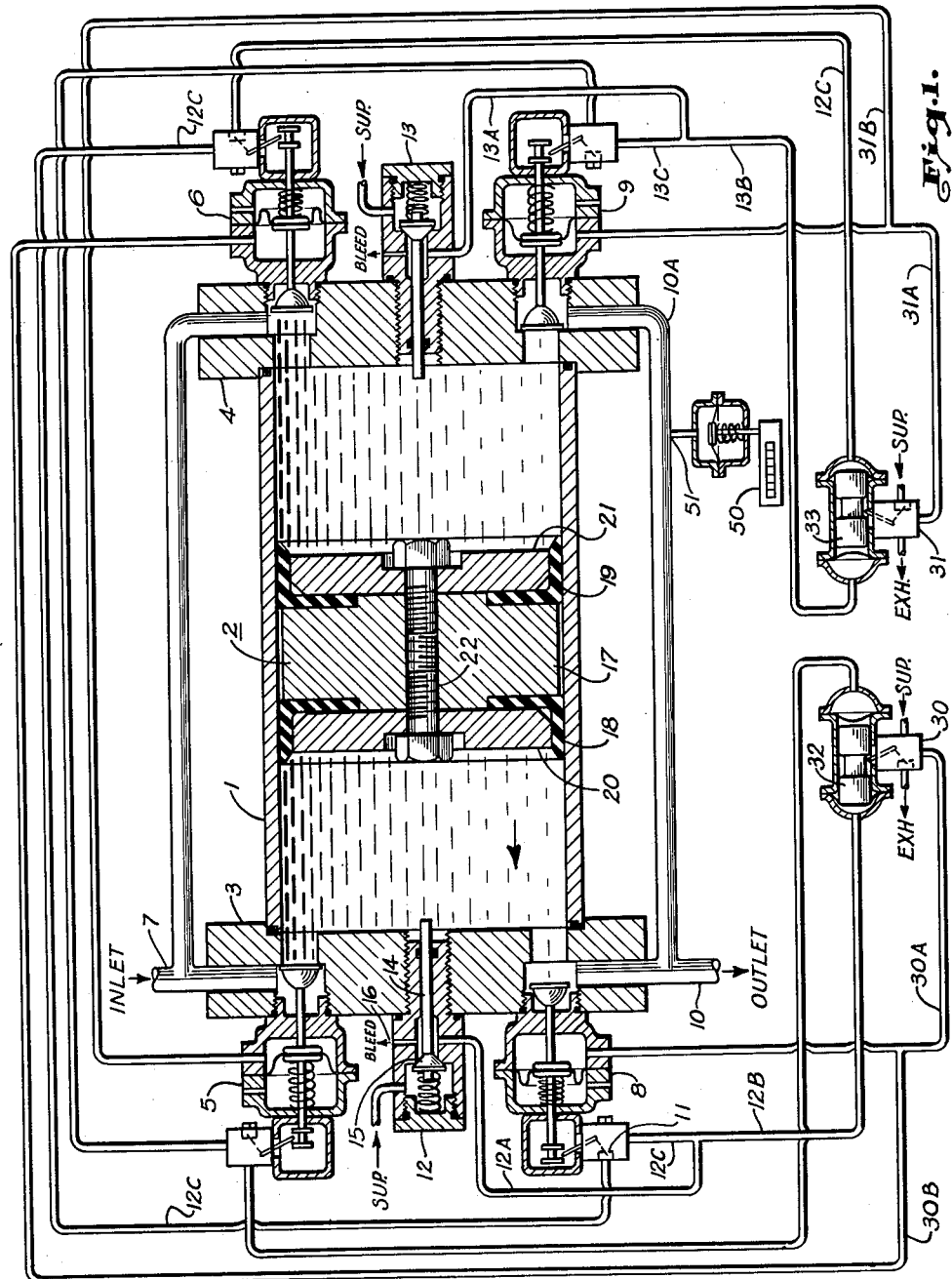
FIG. 1 is a somewhat diagrammatic elevation in cross section of a meter in which the invention is embodied.
Figure 2:
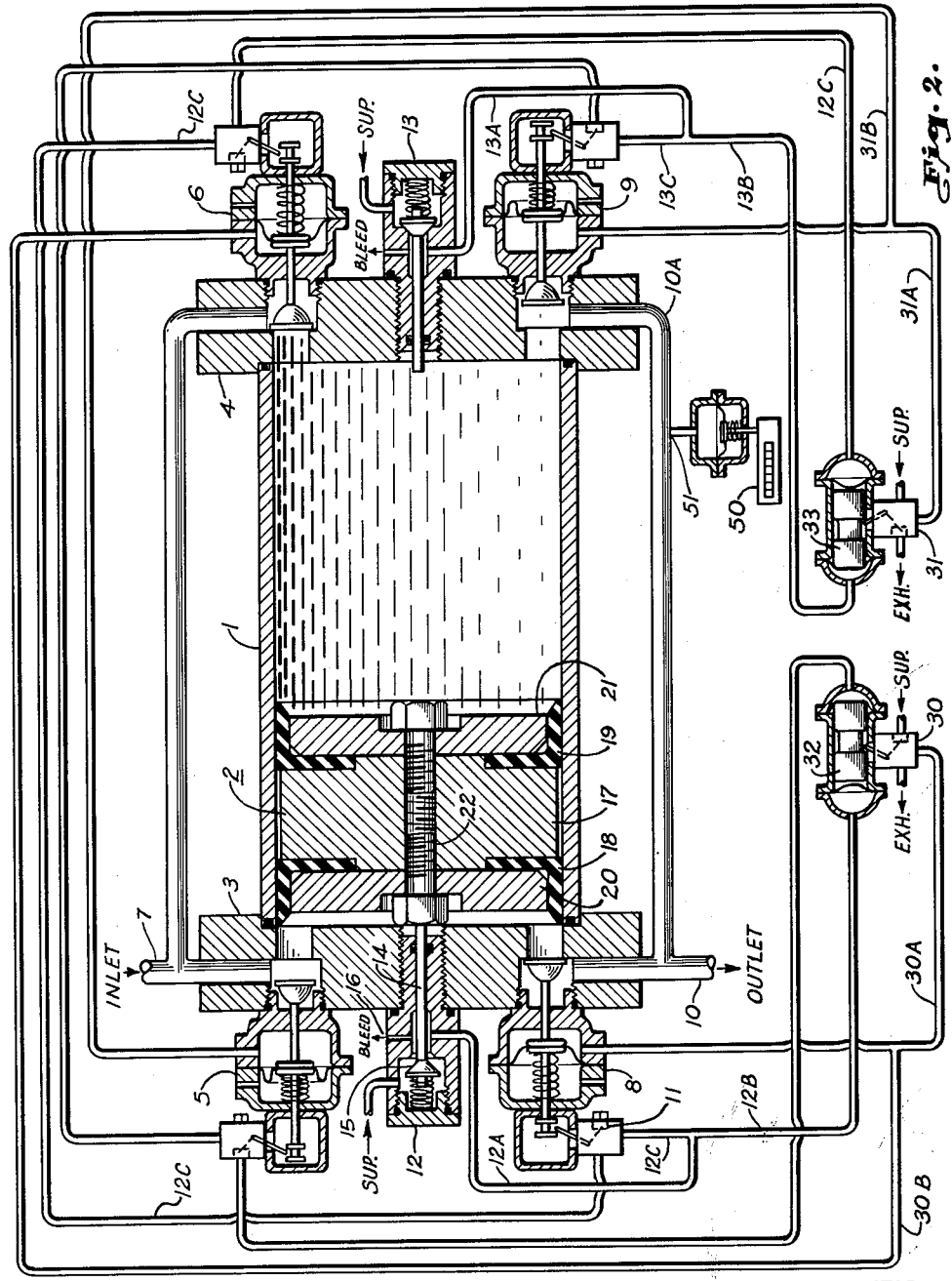
FIG. 2 shows the control system of FIG. 1, but with the free piston of the meter positioned at one end of its stroke.

FIG. 3 similar to FIG. 1, but showing a more simple control system for the meter valves;

And FIG. 4 shows the control system of FIG. 3 and the free-piston in the position of FIG. 2.

Referring to FIGS. 1 and 2, the meter and its control system in which the invention is embodied is shown in two positions, selected to give complete comprehension of the cycle of operation. Identical numerical designations are used in the two figures, the only difference in the two figures being the positions of the valves and free-piston.

GENERAL ARRANGEMENT OF THE METER

The body of the meter is characterized by an elongated housing 1 which functions as a cylinder for reciprocating free-piston 2. The housing 1 is shown as a cylinder in a horizontal arrangement, open at each end and sealed to end plates 3 and 4.

End plates 3 and 4 are sealed to the open ends of cylinder housing 1 by any suitable arrangement. The plates are identical, and each plate has an inlet valve and an outlet valve mounted in it to pass fluid to be metered through the meter.

More specifically, inlet valve 5 and inlet valve 6 are both connected to inlet conduit 7. These inlet valves are alternately opened and closed to simultaneously draw fluid to be metered from conduit 7 into the housing 1 on each side of free piston 2.

Outlet valves 8 and 9 are also mounted in end plates 3 and 4 and these valves are connected to discharge conduit 10. Along with inlet valves 5 and 6, outlet valves 8 and 9 are alternately opened and closed to continuously withdraw fluid from each side of free piston 2 as metered fluid.

There is no need to describe these valves in greater detail. They are illustrated as quite conventional in form. They are spring loaded to close. A control fluid pressure beneath their diaphragms opens them against their spring forces to connect the inlet conduit 7 and discharge conduit 10, alternately, to opposite sides of the free piston 2.

The valve stems of valves 5, 6 and 8, 9 extend through their springs and into separate housings on top of the valve housings. These stems are supplied with mechanical abutments which are arranged to actuate two-position, snap-acting, interlock valves. Each of these interlock valves have their snap-acting structure disclosed and claimed as the subject matter, of Patent 2,860,660 which issued November 18, 1958. One of the commercial types covered by this patent is manufactured by and available through Barworth, Inc., Springfield, New Jersey. The valves are somewhat diagrammatically illustrated with shuttles 11 which are snapped from their one position to their other by linkage contacted with the abutments mounted on the valve stems.

In general, the interlock valves predetermine the application of certain control fluid pressures of the meter system to prevent one of either set of inlet and outlet valves from being open at the same time. Therefore, "slippage" of fluid from the inlet conduit 7 to the delivery conduit 10 is prevented.

Mounted centrally in each of plates 3 and 4 is a shift valve. These shift valves 12 and 13 are arranged to be actuated by free-piston 2 at each end of the stroke of the free-piston. Valve stem 14 of shift valve 12 is spring-loaded to force valve element 15 onto its seat. Free-piston 2 strikes stem 14 and lifts seat 15 against the spring force. Unseating of valve 12 and valve 13 by the free-piston connects a supply of control fluid pressure to the outlet conduit of each valve. A bleed port 16 is provided below the seat 15 so that when the valve re-seats the control fluid pressure output of the valve 12 will return to atmospheric value after a predetermined length of time. Each shift valve works the same, so the foregoing outline of operation is applied to both.

The free-piston 2 may take a very simple form, as illustrated. A central base 17 has seals 18 and 19 clamped to it by end plates 20 and 21. A central bolt-nut combination 22 not only holds the combination together as a unit, but it provides the specific surfaces which engage the stems of shift valves 12 and 13 to generate the control fluid pressure outputs.

CONTROL SYSTEM

*Power Loops.*—There are two power loops, or manifolds, for each of the two sets of valves. An inlet valve and an outlet valve are opened and closed together. Therefore, each manifold, or loop, is connected to an inlet valve and an outlet valve and a power fluid pressure alternately developed in the loop and discharged to atmospheric pressure.

Power valves 30, 31 are actuated to develop and decay the power impulses. The power impulses are applied to pipes 30A, 30B and 31A, 31B. The pipes 30A, 30B connect to inlet valve 6 and outlet valve 8 as the first power loop to open the valves when the power fluid pressure is applied by power valve 30. Power valve 31, pipes 31a, 31b, inlet valve 5 and outlet valve 9 function in exactly the same manner. The control loops alternately impulsed from shift valves 12 and 13, actuate power valves 30 and 31 to open and close the two sets of outlet and inlet valves as required to pass fluid continuously through the meter from inlet conduit 7 to delivery conduit 10.

*Control Loops.*—There are two control loops disclosed in FIGS. 1 and 2. The common denominator of structure between these two loops is the two shift pistons 32 and 33.

Shift pistons 32 and 33 are very simple structures. The fluid pressure impulses generated in each of the control loops are alternately applied to the pistons to shift them from one position to their alternate position. Each piston is mechanically linked to power valves 30 and 31 so as to cause the power valves to develop and decay their outputs in accordance with the control fluid pressures developed in the control loops.

Shift valves 12 and 13 have their outputs placed in the control loops to reciprocate pistons 32 and 33. Shift valve 12, representative of both shift valves, is actuated by free-piston 2 in FIG. 2 to develop a control fluid pressure in pipe 12A. Pipe 12A branches into pipes 12B and 12C, all three pipes constituting the first control loop.

Pipe 12B applies its control fluid pressure to the left side of shift piston 32. Power valve 30 is then actuated to decay its output in pipe 30A and pipe 30B. Input valve 6 and output valve 8 are directly actuated to their closed position.

Closure of valves 6 and 8 cause their interlock valves to open pipe 12C to the right side of shift piston 33. Power valve 31 develops its output in pipes 31A and 31B to open outlet valve 9 and inlet valve 5. Fluid to be metered flows from conduit 7 into cylinder 1, on the left side of piston 2. Fluid metered flows from the right side of piston 2 into discharge conduit 10. Free-piston 2 moves to the right until shift valve 13 is struck and actuated to place the valves in the position illustrated in FIG. 1.

The second control loop is a mirror image of the first. Pipe 13A receives the output of shift valve 13 and applies it to pipes 13B and 13C. Shift piston 33 is shifted to the right. Power valve 31 closes outlet valve 9 and inlet valve 5. Closure of valve 9 and valve 5 causes their interlock valves to open pipe 13C to the right side of shift piston 32. Power valve 30 is then caused to open outlet valve 8 and inlet valve 6.

OPERATION

It is to be noted that the output of each shift valve is applied to opening and closing the inlet and outlet valves through shift pistons 32 and 33. Further, the output of the power valves 30 or 31 must close the outlet valves 8 and 9 before their interlock valves will clear the control pipes to the other shift piston which generates the power pressure to open inlet valves 5 and 6. Thus, this embodiment does not depend upon simultaneous mechanical action of valves to insure an inlet and an outlet valve are not open at the same time on one side of the free-piston. The outlet valve of the meter must be closed before the inlet valve can be opened by the same control fluid pressure that closed the outlet valve. In this way the possibility of the control system causing the valves on either side of the piston to be open at the same time is eliminated with positive action.

ALTERNATE CONTROL SYSTEM

FIGS. 3 and 4 illustrate the meter of FIGS. 1 and 2, but with a somewhat modified control system. The basic meter elements of elongated housing 1, free-piston 2, and plates 3 and 4 and shift valves 12 and 13 are just as disclosed in FIGS. 1 and 2. However, inlet valves 40, 41 and outlet valves 42, 43 do not have interlock valves mounted on them. The valves 40–43 are spring-closing, but receive their opening power from the output of power valves 44, 45.

Power valves 44, 45 are similarly mounted on shift piston 46. Valves 44, 45 are mechanically actuated, simultaneously, by engagement with shift piston 46. Piston 46 is simply reciprocated by the outputs of shift valves 12 and 13.

The operation of the meter of FIGS. 3 and 4 is quite simple. In FIG. 3 valve 13 has been actuated and piston 46 moved to the left. Power valve 44 has exhausted the pressure in manifold pipe 47. Inlet valve 40 and outlet valve 43 close. Simultaneously, power valve 45 develops a fluid pressure in pipe 48. This power fluid pressure opens inlet valve 41 and outlet valve 42. As free-piston 2 moves to the left, metered fluid is passed out of housing 1. The reversal of the valves is illustrated in FIG. 4. In FIG. 4 the free-piston moves to the right. Fluid continuously passed through the housing is thereby metered.

GENERAL

Note in both embodiments of the invention, it is necessary to remove the force from one end of the shift pistons before applying a force to their other ends. In both embodiments illustrated this removal is shown as accomplished by bleeding off the output established by the shift valves. Bleed 16 in FIG. 1 illustrates a possible location for this structure.

The actual accumulation of the reciprocations of free-piston 2, as the volume of fluid passed through the meter, is the ultimate result sought by the meter.

These reciprocations can be totaled in various ways. A mechanical link can be made with one of the valves moved each reciprocation. A primary element can be placed in one of the conduits and registration apparatus actuated each time fluid moves periodically in the conduit. Register 50 is representative of the former structure. A primary element, responsive to flow, is placed in conduit 10A at 51. Each time fluid flows from the right side of piston 2, through valve 9 in FIGS. 1 and 2, or valve 43 in FIGS. 3 and 4, the register 50 indicates that twice the volume of the meter has passed into discharge conduit 10.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A meter including,
    an elongated housing, a reciprocating free-piston in the housing,
an inlet valve mounted on each end of the housing,
a source of fluid to be metered connected to the inlet valves,
an outlet valve mounted on each end of the housing,
a delivery conduit connected to the outlet valves for the fluid metered,
a shift valve mounted on each end of the housing so each shift valve will be actuated by the reciprocating piston to establish separate shift control pressures,
a shift piston connected to the shift valves so as to respond to the shift control pressures,
a control valve system mechanically connected to the shift piston to establish and decay two control pressures alternately which are applied to the inlet and outlet valves so the housing on each side of the piston will alternately fill through the inlet valves with fluid to be metered and discharge the fluid to the delivery conduit through the outlet valves without an inlet valve and an outlet valve on the same side of the piston being open at the same time,
and means for registering the quantity of fluid delivered by the meter.

2. A meter including,
an elongated housing,
a reciprocating free-piston in the housing,
an inlet valve mounted on each end of the housing,
a source of fluid to be metered connected to the inlet valves,
an outlet valve mounted on each end of the housing,
a delivery conduit connected to the outlet valves for the fluid metered,
a shift valve mounted on each side of the housing so each shift valve will be actuated by the reciprocating piston to establish a fluid control pressure pulse,
a first reciprocating shift piston connected directly to one shift valve and indirectly to the other shift valve through interlock valves controlled by an inlet valve and an outlet valve an opposite ends of the housings to actuate a control valve which alternately opens and closes the other inlet valve and other outlet valve simultaneously,
and a second reciprocating shift piston connected directly to the other shift valve and indirectly to the first shift valve through interlock valves controlled by an inlet valve and an outlet valve on opposite ends of the housing to actuate a control valve which alternately opens and closes the other inlet and outlet valve simultaneously and alternately with the inlet valve and outlet valve opened and closed by the first reciprocating shift piston.

3. A meter including,
an elongated housing,
a reciprocating free-piston in the housing,
an inlet valve mounted on each end of the housing,
a source of fluid to be metered connected to the inlet valves,
an outlet valve mounted on each end of the housing,
a delivery conduit connected to the outlet valves for the fluid metered,
a first power valve developing and decaying an output power fluid pressure to simultaneously open and close an outlet valve on one end of the housing and an inlet valve on the other end of the housing,
a second power valve developing and decaying an output power fluid pressure to simultaneously open and close the other outlet valve and other inlet valve,
a first and second shift piston mechanically actuating the power valves and responding to control fluid pressures to alternately actuate the two sets of inlet and outlet valves,
a first shift valve mounted on one end of the housing and actuated by the reciprocating piston to establish a shift control pressure,
a first control loop receiving the first shift control pressure and positioning the shift pistons to close one set of inlet and outlet valves and open the other set of inlet and outlet valves,
a second shift valve mounted on the other end of the housing and actuated by the reciprocating piston to establish a shift control pressure,
a second control loop receiving the second shift control pressure and positioning the shift pistons to open the one set of inlet and outlet valves and close the other set of inlet and outlet valves,
and a register responsive to the number of times fluid discharges from the meter as an indication of the positive volume of fluid delivered through the meter.

4. A meter including,
an elongated housing,
a reciprocating free-piston in the housing,
an inlet valve mounted on each end of the housing,
a source of fluid under pressure to be metered connected to the inlet valves,
an outlet valve mounted on each end of the housing,
a delivery conduit connected to the outlet valves for the fluid metered,
a shift valve mounted on each end of the housing and controlling supply pressures when mechanically actuated by the reciprocating piston to establish separate shift control pressures,
a two-position shift piston responding to the shift control pressures to alternate between its two positions,
a first two-position valve actuated by the shift piston and connected to an inlet valve and an outlet valve to simultaneously open one valve and close the other valve,
a second two-position valve actuated by the shift piston and connected to the other inlet valve and other outlet valve to simultaneously open one valve and close the other valve alternately with the inlet valve and outlet valve connected to the first two-position valve so the housing on each side of the piston will alternately fill through the inlet valves with fluid to be metered and discharge the fluid to the delivery conduit through the outlet valves without an inlet valve and an outlet valve on the same side of the piston being open at the same time,
and means for registering the quantity of fluid delivered by the meter.

References Cited in the file of this patent
UNITED STATES PATENTS

| | | |
|---|---|---|
| 1,199,526 | Bowser | Sept. 26, 1916 |
| 1,464,676 | Harrington | Aug. 14, 1923 |
| 1,470,381 | Lamb | Oct. 9, 1923 |